United States Patent [19]

Bowden, Jr. et al.

[11] Patent Number: 4,505,403
[45] Date of Patent: Mar. 19, 1985

[54] WEATHERPROOF ELECTRICAL RECEPTACLE COVER

[75] Inventors: Wade R. Bowden, Jr., Northport; David Herzfeld, Hicksville, both of N.Y.

[73] Assignee: Slater Electric, Inc., Glen Cove, N.Y.

[21] Appl. No.: 614,767

[22] Filed: May 29, 1984

[51] Int. Cl.³ .............................................. H02G 3/14
[52] U.S. Cl. .................................... 220/242; 174/67; 339/44 M
[58] Field of Search ............... 220/242, 342, 341, 3.8, 220/241, 337; 174/67; 339/44 R, 44 M

[56] References Cited

U.S. PATENT DOCUMENTS 4,134,516  1/1979  Sullo ................................... 220/242
4,381,063  4/1983  Leong .................................. 220/242

Primary Examiner—George T. Hall
Attorney, Agent, or Firm—Morgan, Finnegan, Pine, Foley & Lee

[57] ABSTRACT

In a weatherproof cover for an electrical receptacle, a plurality of lids are rotatably mounted in a generally rectangular base plate having three surrounding walls. A butterfly shaped biasing member is disposed between the lids and the base plate and applies a force to the lids to hold them in close proximity to the base plate in order to form a weatherproof seal. The lids cover receptacle access apertures which extend through the base plate and a stiffening plate disposed behind the base plate.

14 Claims, 11 Drawing Figures

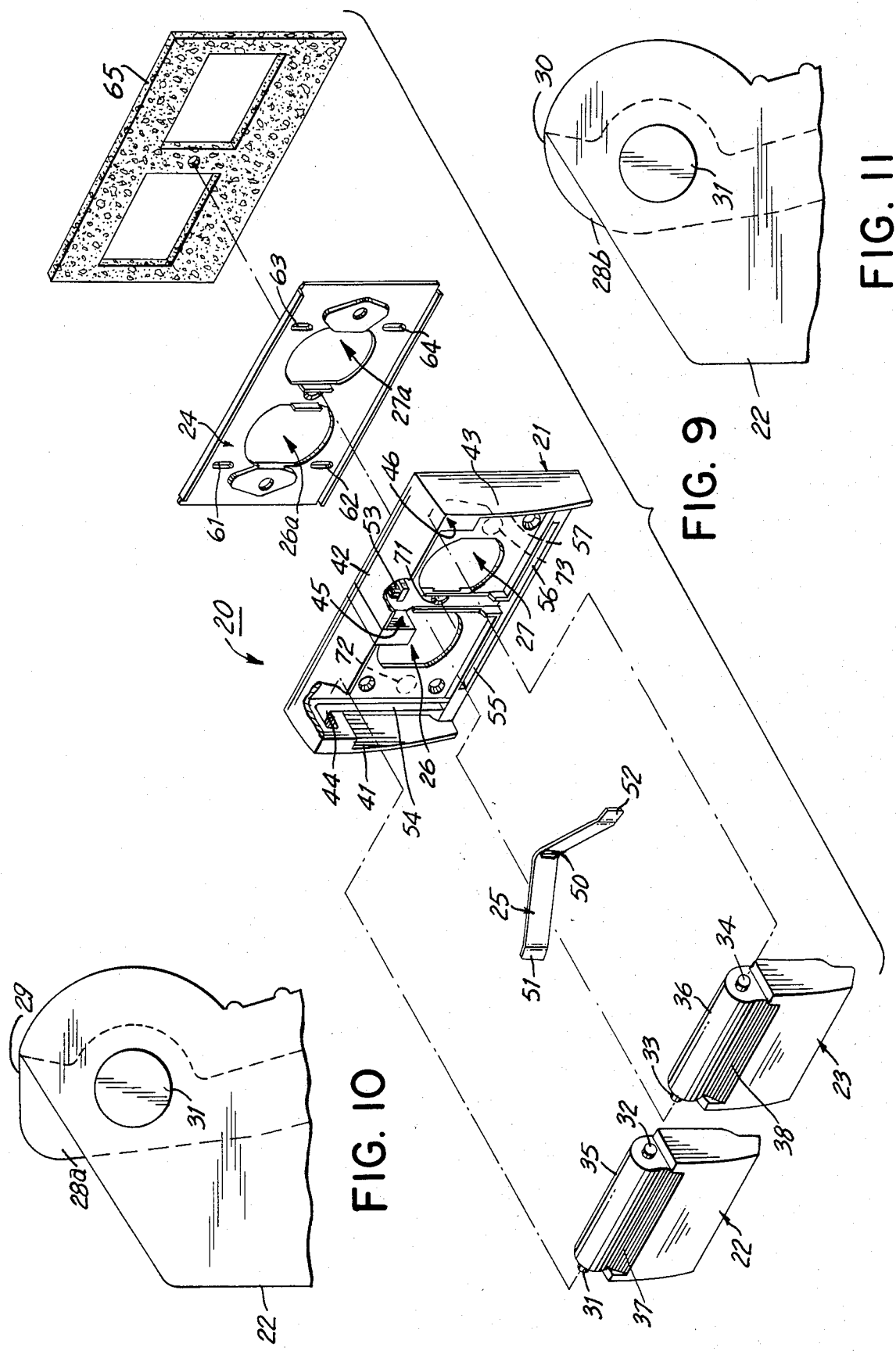

WEATHERPROOF ELECTRICAL RECEPTACLE COVER

BACKGROUND OF THE INVENTION

1. Field of the Invention

The apparatus of the present invention relates to electrical outlet box covers and more specifically to a weatherproof electrical receptacle cover.

2. Description of the Prior Art

Weatherproof electrical receptacle covers are well known in the prior art and a representative example is disclosed in U.S. Pat. No. 3,252,611 assigned to the assignee of the present invention. The aforesaid patent discloses an electrical outlet cover having a plurality of rotatable lids mounted on a base plate having apertures that provide access to an electrical receptacle. Each lid cooperates with a respective spring to provide a force for closing the lid and holding it in closed proximity to the base plate. The interface between the lid and base plate is not weatherproof and, therefore, the lid requires a foam gasket to seal the lid/base plate interface.

The use of a foam gasket to seal the lid/base plate interface is typical in prior art weatherproof electrical receptacle covers. The use of such foam gaskets, however, is undesirable, since they tend to deteriorate with age and use. Moreover, the frequent opening and closing of the lids weakens the adhesives used to affix the foam gaskets to the lids and the foam gaskets fall out and become lost, thereby destroying the weatherproof seal.

Accordingly, there is a need for a weatherproof electrical receptacle cover which does not require a foam gasket at the lid/base plate interface.

SUMMARY OF THE INVENTION

The apparatus of the present invention provides a weatherproof electrical receptacle having a base plate and a plurality of lids which cooperate such that a foam gasket is not needed between the lid/base plate interface. The apparatus includes a substantially rectangular base plate having access aperatures for the receptacle and three walls which surround the base plate. A butterfly shaped biasing member having two flat surfaces disposed at its distal ends is retained at its midpoint in the base plate. A pair of sloping lids which cover the receptacle access apertures are rotatably mounted in slots formed in the surrounding walls. The lids, which are retained in the slots, include cams which cooperate with the flat surfaces of the butterfly biasing member to provide a force for holding the lids in close proximity to the base plate, thereby providing a weatherproof seal.

BRIEF DESCRIPTION OF THE DRAWINGS

FIG. 9 is an exploded view of the weatherproof electrical receptacle cover of the present invention;

FIG. 10 is an enlarged illustration of a cam, having a flat surface, protruding from the lid of the weatherproof electrical receptacle cover; and FIG. 11 is an enlarged illustration of an alternate cam, having an arcuate surface, protruding from the lid of the weatherproof electrical receptacle cover.

DETAILED DESCRIPTION OF THE INVENTION

Figure 1:
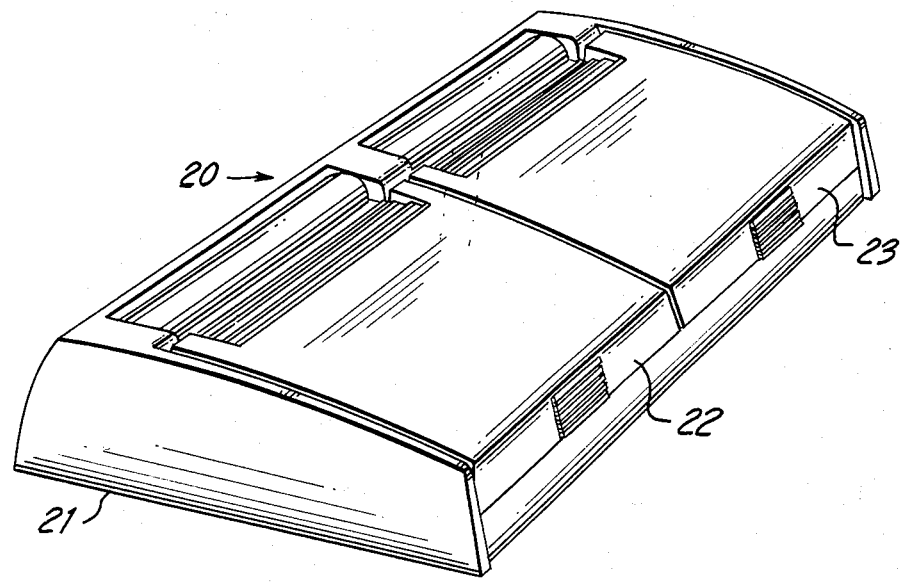
FIG. 1 is an illustration in perspective of the apparatus of the present invention.
Figure 2:
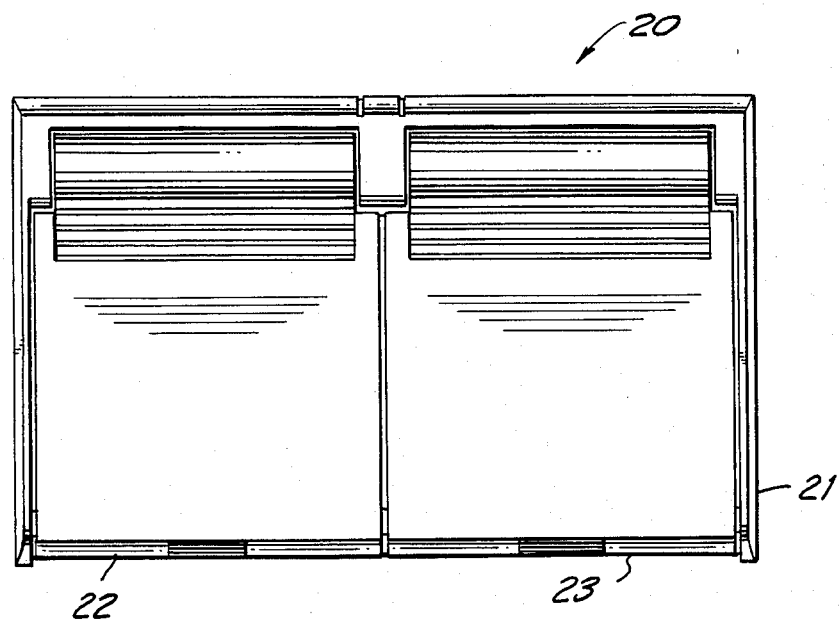
FIG. 2 is an elevation view of the weatherproof electrical receptacle cover of FIG. 1.
Figure 3:
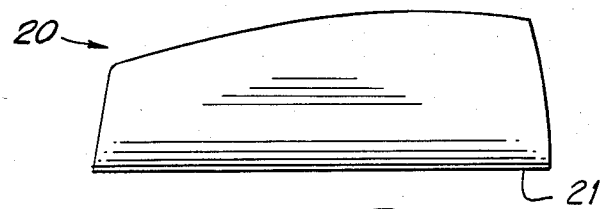
FIG. 3 is a side view of the weatherproof electrical receptacle cover of FIG. 1.
Figure 4:
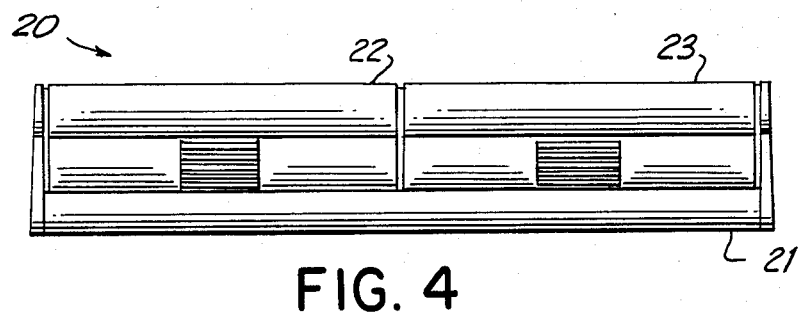
FIG. 4 is a front view at the weatherproof electrical receptacle cover of FIG. 1.
Figure 5:
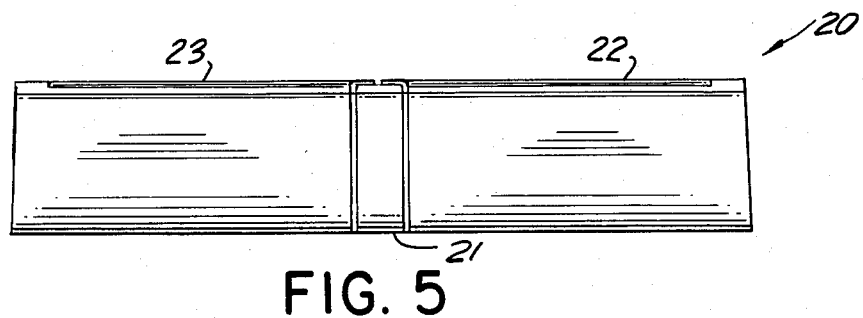
FIG. 5 is a rear view at the weatherproof electrical receptacle cover of FIG. 1.
Figure 6:
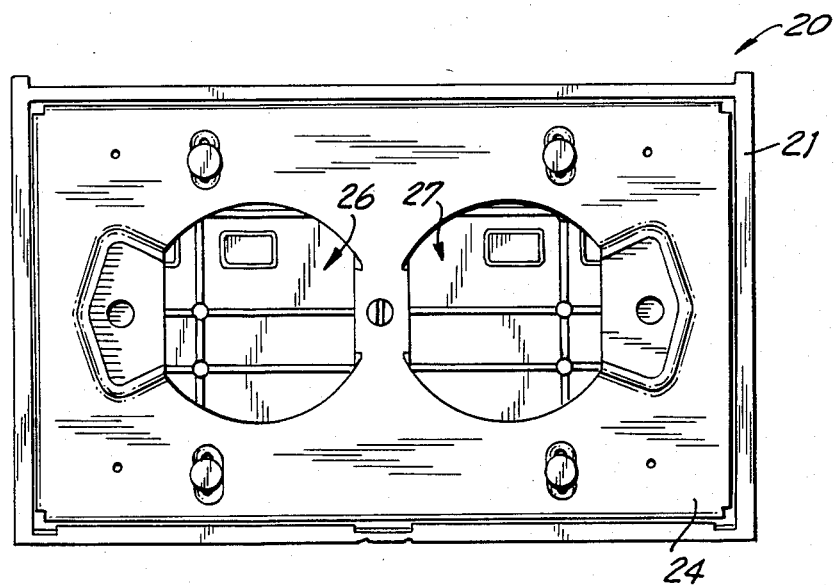
FIG. 6 is a bottom view of the weatherproof electrical receptacle cover of FIG. 1.

Referring now to FIGS. 1-6, various views of the weatherproof electrical cover 20 of the present invention are provided. The cover 20 preferably includes plastic components molded in a two part molding process. The major components of the device include a plastic base plate 21, plastic lids 22 and 23, a metal stiffening plate 24 and a metal butterfly shaped biasing member 25 (see FIGS. 7, 9). All the plastic components are designed such that a side coring molding process is unnecessary and this results in a substantial decrease in manufacturing efficiency and cost. The covers 22, 23 are interchangeable.

Figure 7:
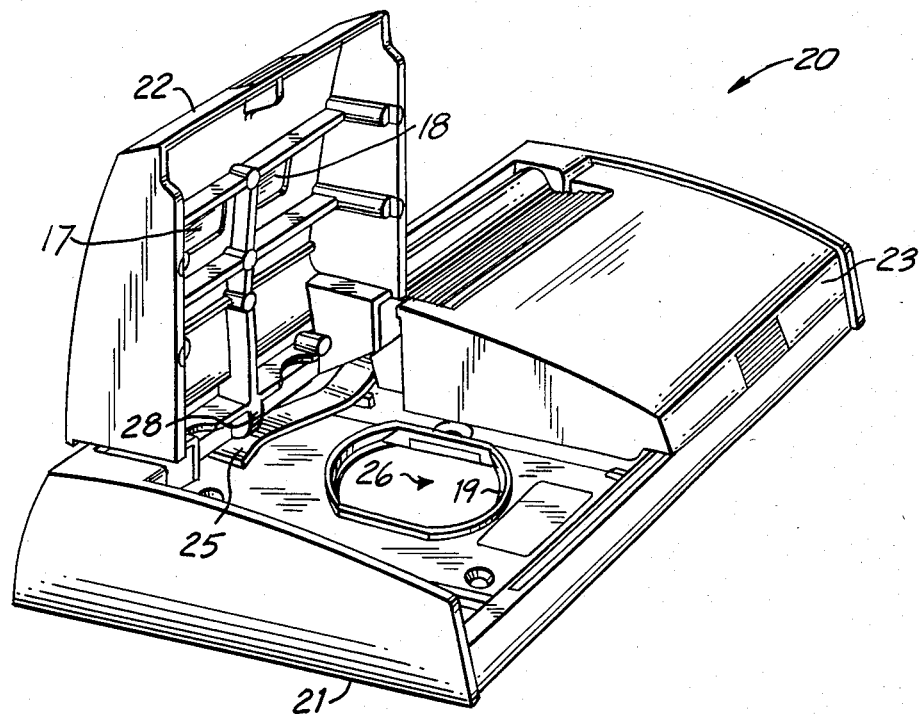
FIG. 7 is a perspective view of the apparatus of the present invention with one lid thereof in an open position.
Figure 8:
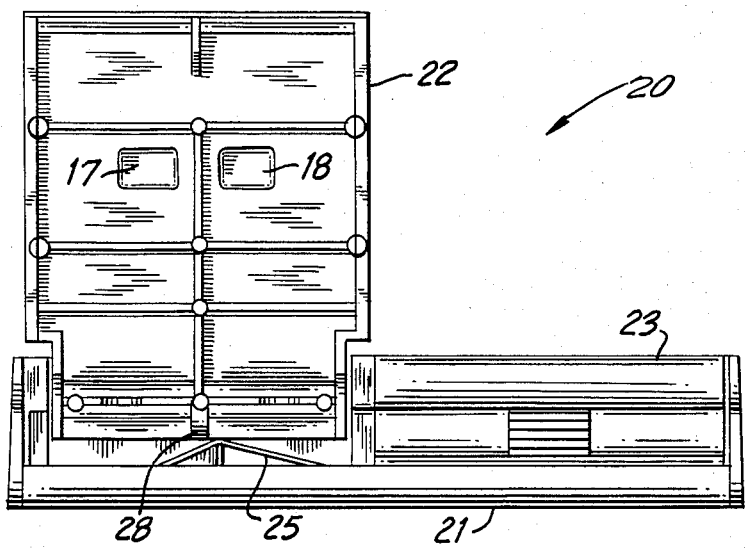
FIG. 8 is a side view of the weatherproof electrical receptacle cover of FIG. 7.

Referring now to FIGS. 7, 8, perspective and side views of the weatherproof electrical receptacle cover 20 with the lid 22 in the open position are provided. In the open position it can be appreciated that the base plate 21 includes an access aperture 26 which provides access to an electrical receptacle when the cover 20 is attached to a standard electrical receptacle. The access aperture 26 includes a ridge 19 which surrounds its outer periphery and prevents water from entering the electrical receptacle. The lid 22 also includes notches 17, 18 which provide clearance when a duplex switch is used instead of an electrical receptacle.

Referring now to FIG. 9, an exploded view of the apparatus of the present invention is provided. The lids 22, 23 each have two bosses, 31-32 and 33-34 respectively protruding therefrom which are used to rotatably mount the lids in the base plate 21. The bosses 31-34 extend from generally cylindrical portions 35, 36 of the lids 22, 23 which mount within the base plate 21 and provide a relatively smooth and tight fit as the lids rotate. A plurality of straight ridges 37, 38 extend from the cylindrical portions 35, 36 and form a transition to the gently sloping exterior surfaces of the lids 22, 23.

The base plate 21 includes three walls 41, 42, 43 which extend substantially perpendicularly from the base plate 21. The wall 42 adjoins walls 41, 43 and a corner is formed where the walls join. At the corner formed between walls 41, 42 the base plate 21 is cutaway to expose a j-shaped slot 44 formed in wall 41. Similar j-shaped slots 45, 46 are formed at the midpoint of adjoining wall 42 and the corner formed between walls 42 and 43. The electrical receptacle cover of the present invention can be mounted with the wall 42 disposed in either a vertical or horizontal position to provide waterproof protection.

The butterfly biasing member 25 is comprised of a generally V-shaped strip of metal preferably having two flattened surfaces 51, 52 at its distal ends. In the apex of the butterfly spring 25 there is preferably located a rectangular notch 50 which cooperates with a tang 53 in the base plate 21 to retain the butterfly spring 25.

The lids 22, 23 are snapped into the coverplate 21 and are retained therein by the j-shaped slots 44, 45, 46 which cooperate with bosses 31-34. The butterfly spring 25 exerts a force upon the lids 22, 23 to keep the lids held in close proximity to the cover plate 21 when they are closed. When the lids 22, 23 are closed the edges of the lids cooperate with grooves 54-57 to form a weatherproof seal which prevents water from entering the electrical receptacle.

The metal stiffening plate 24 is preferably coupled to the plastic base plate 21 by a plurality of stakes which pass through apertures 61-64 and are then melted by application of heat or ultrasonic techniques. The stiffening plate 24 provides rigidity to the cover 20. The stiffening plate 24 also completes enclosure of the outlet box in order to meet National Electric Code Standards for fire safety.

The cover 20 can be affixed to a standard electrical outlet box in either of two ways depending upon the number of holes provided in the base plate 21. If a single hole 71 is provided in the center of base plate 21, the cover 20 is affixed by a screw which threads into the center hole of a duplex receptacle which has been preferably affixed to the outlet box by its mounting means. If the base plate 21 is additionally provided with holes 72, 73 shown in dotted lines, then the cover 20 is affixed to the receptacle through hole 71 and the cover 20 and receptacle assembly are affixed to the outlet box by the two screws which fasten through holes 72 and 73. A foam gasket 65 is preferably disposed between the cover 20 and the outlet box to prevent water from entering the outlet box at this interface.

Referring now to FIGS. 10, 11 alternate embodiments of cam 28 (illustrated in FIG. 7) which transmits the force of butterfly spring 25 to the lids 22, 23 are provided. In FIG. 10 the cam 28a is illustrated as extending from the lid 22 and having a generally flat surface 29. The flat surface 29 cooperates with the flat surface 51 of butterfly spring 25 to hold the lid 22 in the open position when an opening force is removed from the lid. When a cam 28b of the type illustrated in FIG. 11 is utilized in lieu of cam 28a the lid 22 automatically snaps shut when the opening force is removed from the lid. This automatic snap action is attributable to the off center arcuate surface 30 of cam 28b which will not hold the lid 22 in the open position.

While the invention has been described in its preferred embodiments it is to be understood that the words which have been used are words of description rather than limitation and that changes may be made within the purview of the appended claims without departing from the true scope and spirit of the invention in its broader aspects.

What is claimed:

1. A weatherproof cover for attachment to the face of an electrical outlet box which comprises;
    a generally rectangular base plate having three side walls surrounding and substantially perpendicular to said base plate, wherein one of said walls adjoins the remaining two walls and a plurality of apertures in said base plate for providing access to an electrical device;
    a butterfly biasing member having a flat surface disposed at each distal end and engaged with the base plate at the midpoint of the spring;
    a plurality of lids with bosses protruding from each side, the bosses of said lids engaging slots formed at the two corners formed between the adjoining wall and the other side walls and at a slot formed at the midpoint of the adjoining wall, said lids further including cams for cooperating with the flat surfaces disposed at the distal ends of the butterfly biasing member to exert a force on said lids such that the lids are held in close proximity to said base plate to form a weatherproof seal.

2. A weatherproof cover according to claim 1 which further includes a stiffening plate for said base plate.

3. A weatherproof cover according to claim 2 wherein said cams have a substantially arcuate surface which causes the lids to close when the opening force is removed from the lids.

4. A weatherproof cover according to claim 2 wherein said cams have a substantially flat surface which causes the lids to remain open when the opening force is removed from the lids.

5. A weatherproof cover according to claim 3 wherein said lids include a cylindrical portion disposed between said bosses, a sloping exterior surface extending from said cylindrical portion and a transition surface having a plurality of straight ridges disposed between said cylindrical portion and said sloping surface.

6. A weatherproof cover according to claim 4 wherein said lids include a cylindrical portion disposed between said bosses, a sloping exterior surface extending from said cylindrical portion and a transition surface having a plurality of straight ridges disposed between said cylindrical portion and said sloping surface.

7. A weatherproof cover according to claim 3 wherein the slots of said base plate retaining the bosses of said lids are j-shaped.

8. A weatherproof cover according to claim 4 wherein the slots of said base plate retaining the bosses of said lids are j-shaped.

9. A weatherproof cover according to claim 7 wherein said base plate includes a plurality of grooves for cooperating with the edges of said lids.

10. A weatherproof cover according to claim 8 wherein said base plate includes a plurality of grooves for cooperating with said lids.

11. A weatherproof cover according to claim 3 wherein said base plate and said stiffening plate include a hole at their midpoints for attaching said weatherproof cover to an electrical receptacle.

12. A weatherproof cover according to claim 4 wherein said base plate and said stiffening plate include a hole at their midpoints for attaching said weatherproof cover to an electrical receptacle.

13. A weatherproof cover according to claim 3 wherein said base plate and said stiffening plate include a hole between each access aperture and each nonadjoining wall for attaching said weatherproof cover to an electrical receptacle and its outlet box.

14. A weatherproof cover according to claim 4 wherein said base plate and said stiffening plate include a hole between each access aperture and each nonadjoining wall for attaching said weatherproof cover to an electrical receptacle and its outlet box.

* * * * *